US012463259B1

(12) United States Patent
Jorda et al.

(10) Patent No.: US 12,463,259 B1
(45) Date of Patent: Nov. 4, 2025

(54) INTEGRATED AND COMPACT COMBINED HEAT AND POWER SYSTEMS AND RELATED METHODS

(71) Applicant: Enginuity Power Systems, Inc., Alexandria, VA (US)

(72) Inventors: Scott Jorda, Westminster, MD (US); William V. Meyers, Jr., Sherwood Forest, MD (US); Steven Niswander, Boyce, VA (US)

(*) Notice: Subject to any disclaimer, the term of this patent is extended or adjusted under 35 U.S.C. 154(b) by 0 days.

(21) Appl. No.: 19/016,127

(22) Filed: Jan. 10, 2025

(51) Int. Cl.
| | |
|---|---|
| H01M 10/42 | (2006.01) |
| F24D 18/00 | (2022.01) |
| F28D 7/16 | (2006.01) |
| H01M 10/48 | (2006.01) |
| H01M 16/00 | (2006.01) |
| H01M 50/204 | (2021.01) |

(52) U.S. Cl.
CPC .......... *H01M 10/425* (2013.01); *F24D 18/00* (2022.01); *F28D 7/16* (2013.01); *H01M 10/482* (2013.01); *H01M 16/006* (2013.01); *H01M 50/204* (2021.01)

(58) Field of Classification Search
None
See application file for complete search history.

(56) References Cited

U.S. PATENT DOCUMENTS

| | | | |
|---|---|---|---|
| 4,226,214 A | 10/1980 | Palazzetti | |
| 4,495,901 A | 1/1985 | Nannini et al. | |
| 4,736,111 A * | 4/1988 | Linden | F02G 5/02 290/2 |
| 4,951,871 A * | 8/1990 | Hata | F02B 77/13 237/12.3 A |
| 5,918,805 A | 7/1999 | Guyer | |
| 7,119,450 B2 | 10/2006 | Albrecht | |
| 7,695,049 B2 | 4/2010 | Colborne | |
| 7,781,902 B2 | 8/2010 | Cerney et al. | |
| 8,132,738 B2 | 3/2012 | Fraccaro | |
| 8,593,002 B2 | 11/2013 | Hamm et al. | |
| 8,847,417 B2 | 9/2014 | Kaiser | |

(Continued)

FOREIGN PATENT DOCUMENTS

| | | |
|---|---|---|
| EP | 2 700 802 | 2/2014 |
| EP | 3 228 546 | 10/2017 |
| WO | WO 2018/211263 | 11/2018 |

OTHER PUBLICATIONS

Aksheya Chandar; "Integrating CHP and Battery Storage: The Financial Case for Hybrid Solutions"; Integrating CHP and Battery Storage; Endurant Energy; Jan. 7, 2020, Retrieved on May 21, 2024 from https://www.endurant.com/post/integration-chp-and-battery-storae-3; Reprinted May 19, 2025; 7 pages.

(Continued)

*Primary Examiner* — Krystal Robinson
(74) *Attorney, Agent, or Firm* — Capitol Patent & Trademark Law Firm, PLLC

(57) ABSTRACT

Integrated, relatively lightweight and compact combined heat and power systems supported within a single chassis and related methods are disclosed. One system includes one or more batteries, an engine, one or more electrical converters and a control section integrated on a single chassis. Other systems include one or more generators for generating electrical power.

20 Claims, 14 Drawing Sheets

(56) References Cited

U.S. PATENT DOCUMENTS

| | | | |
|---|---|---|---|
| 8,987,938 B2 | 3/2015 | Eschrich et al. | |
| 8,994,214 B2 | 3/2015 | Apalenek et al. | |
| 9,267,706 B2 | 2/2016 | Waninger et al. | |
| 9,429,018 B2 | 8/2016 | Zachary et al. | |
| 9,871,411 B2 | 1/2018 | Ortner | |
| 10,389,121 B1 | 8/2019 | Sherry | |
| 10,790,670 B1 | 9/2020 | Alimadad | |
| 11,444,464 B1 | 9/2022 | Ford et al. | |
| 11,680,691 B2 | 6/2023 | Palmenberg et al. | |
| 11,913,611 B2 | 2/2024 | Avery et al. | |
| 2005/0052029 A1* | 3/2005 | Aldridge | H02J 9/08 290/2 |
| 2005/0284946 A1 | 12/2005 | Komura et al. | |
| 2008/0236561 A1 | 10/2008 | Kaiser | |
| 2012/0244398 A1* | 9/2012 | Youngs | H01M 10/625 429/61 |
| 2014/0277791 A1 | 9/2014 | Lenard et al. | |
| 2017/0038081 A1 | 2/2017 | Lai et al. | |
| 2017/0174086 A1 | 6/2017 | van de Loo | |
| 2017/0288400 A1* | 10/2017 | Williams | F01K 11/02 |
| 2018/0134135 A1* | 5/2018 | Schroth | H01M 50/242 |
| 2018/0266637 A1 | 9/2018 | Curlett et al. | |
| 2020/0127485 A1 | 4/2020 | Friesen | |
| 2022/0107095 A1* | 4/2022 | Schildt | F24D 12/02 |
| 2022/0376526 A1 | 11/2022 | Marotz et al. | |
| 2023/0411968 A1 | 12/2023 | Eilertsen | |

OTHER PUBLICATIONS

Yanmar America Corporation; "Combined Heat and Power (CHP)"; Yanmar CHP; Copyright 2025; Retrieved on May 21, 2024 from https://yanmarenergysystems.com/chp/; Reprinted May 19, 2025; 8 pages.

U.S. Department of Energy; "Combined Heat and Power Technology Fact Sheet Series"; Office of Energy and Renewable Energy—Microgrids Overview; Feb. 2021; Retrieved on May 21, 2024 from https://energy.gov/eere/amo/articles/combined-heat-and-power-technology-fact-sheet-series-microgrids; Reprinted May 19, 2025; 4 pages.

EcoFlow US; "EcoFlow Delta Pro + Smart Generator"; EcoFlow Smart Generator; May 20, 2024; Copyright 2025; Retrieved on May 20, 2024 from https://us.ecoflow.com/products/delta-pro-portable-power-statopm?variant=40700436054089; Reprinted May 19, 2025; 22 pages.

Larson Electronics; "1.8 Hybrid Solar Generator"; Larson Electronics Hybrid Solar Generator; May 20, 2024; Copyright 2025; Retrieved on May 20, 2024 from https://;larsonelectronics.com/product 284061/1-8kw-hybrid-solar-generator-6-300w-panels-26-40ah-batteries-500w-inverter-bc-backup-diesel-genset-n3r-enclosure; Reprinted May 19, 2025; 8 pages.

Powr2; "Hybrid Power Systems 101"; Powr2 Hybrid Power System; May 20, 2024; Copyright POWR2-2025; Retrieved on May 20, 2024 from https://powr2.com/hybrid-power-systems-101/; Reprinted May 19, 2025; 6 pages.

\* cited by examiner

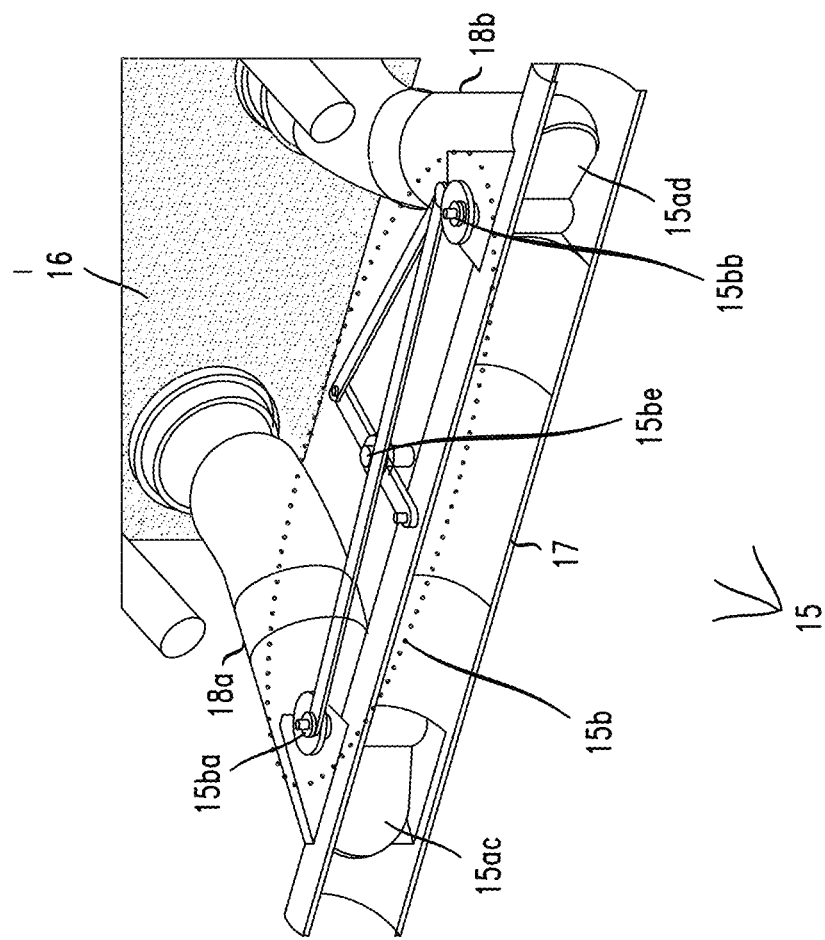

INTEGRATED AND COMPACT COMBINED HEAT AND POWER SYSTEMS AND RELATED METHODS

FIELD

The present disclosure relates generally to an integrated, lightweight and compact combined heat and power (CHP) system that generates, stores and utilizes energy for a variety of applications.

BACKGROUND

Today there is a continuing challenge to economically provide energy. Furthermore, challenges such as packaging and installation complexity remain as design concerns in the development and adoption of combined heat and power (CHP) systems.

Other challenges include complying with relevant EPA or other state environmental regulatory requirements when providing residential or commercial engines used to power a CHP system. Addressing all of these concerns remains an ongoing challenge.

Accordingly, it is desirable to provide CHP systems and related methods that address the above concerns.

SUMMARY

The inventors disclose a number of exemplary embodiments that addresses the above concerns, among other concerns.

For example, in one embodiment an integrated, lightweight and compact combined heat and power (CHP) system may be configured on a single chassis and may comprise: a battery compartment comprising one or more batteries; engine compartment comprising an engine; inverter compartment comprising one or more electrical inverters; an electronic control section, and wherein the battery compartment comprising the one or more batteries, the engine compartment comprising the engine, inverter compartment comprising the one or more electrical inverters and the electronic control section are integrated on the single chassis.

In such a system the volume of the system may comprise a volume of four to five in feet in length, two feet wide and four to five feet in height, and the weight of the system may comprise less than 1,000 pounds.

In the exemplary system the battery compartment may comprise four batteries, the engine may comprise a carb-approved engine (e.g., a two cycle or four cycle combustion or compression engine fuel cell, or electrical engine.

Such an exemplary system may be configured to generate eight kilowatts to twenty-five kilowatts of power, for example.

In addition, the exemplary system may further comprise one or more electrical generators for generating electricity at one or more alternating current (AC) power levels.

In an embodiment, the one or more batteries may comprise one or more removable and rechargeable batteries for storing energy as direct current (DC) power, where each of the one or more batteries may be configured to generate 3 to 4 kilowatts of power, for example. Yet further, the one or more batteries may comprise removable and rechargeable batteries.

In an embodiment, the system may further comprise a catalytic converter and one or more internal heat exchanger units for converting heat from heated gas from the engine to a coolant.

In such an exemplary system the single chassis may comprise a chassis constructed of a plurality of vertical supporting columns, where each vertical column is mechanically connected at each of its ends by at least two horizontal arms and a bottom cover. Still further, each column and arm may be composed of a folded steel, aluminum or carbon fiber material, for example.

In such a system the electronic control section may comprise electronics for completing Bluetooth enabled controls for operating the one or more inverters, one or more batteries and the engine, among other components. The control section may be further configured to detect a power level of the one or more batteries, and when the detected power level is below a threshold, the control section may yet be further configured to electrically connect the one or more inverters to the one or more batteries to charge the one or more batteries to a higher power level.

Alternatively, the control section may yet be further configured to detect that a power level of the one or more batteries has reached a pre-determined or set threshold level, and then the control section may be configured to initiate the start-up of the engine in order to recharge the one or more batteries.

In yet another embodiment the system described above may be combined with an exemplary exhaust gas diversion sub-system that is configured to control a flow of heated exhaust gases from the system.

In such an embodiment the exhaust gas diversion sub-system may be configured to receive electrical or mechanical signals to control the flow of heated exhaust gases from the system to completely expel the heated exhaust gases to the atmosphere, or direct the heated exhaust gases to a second heat exchanger in order to further transfer heat or energy from the heated, exhaust gases to a liquid within the second exchanger and to further reduce a temperature of the heated exhaust gases.

The above exemplary embodiments and others are described herein.

BRIEF DESCRIPTION OF THE DRAWINGS

The disclosure will be described in more detail below on the basis of one or more drawings, which illustrates exemplary embodiments.

FIGS. 12A and 12B depict embodiments of a mechanism that is part of an exhaust gas diversion system in accordance with an embodiment of the present disclosure.

DETAILED DESCRIPTION OF THE EMBODIMENTS

Figure 1:
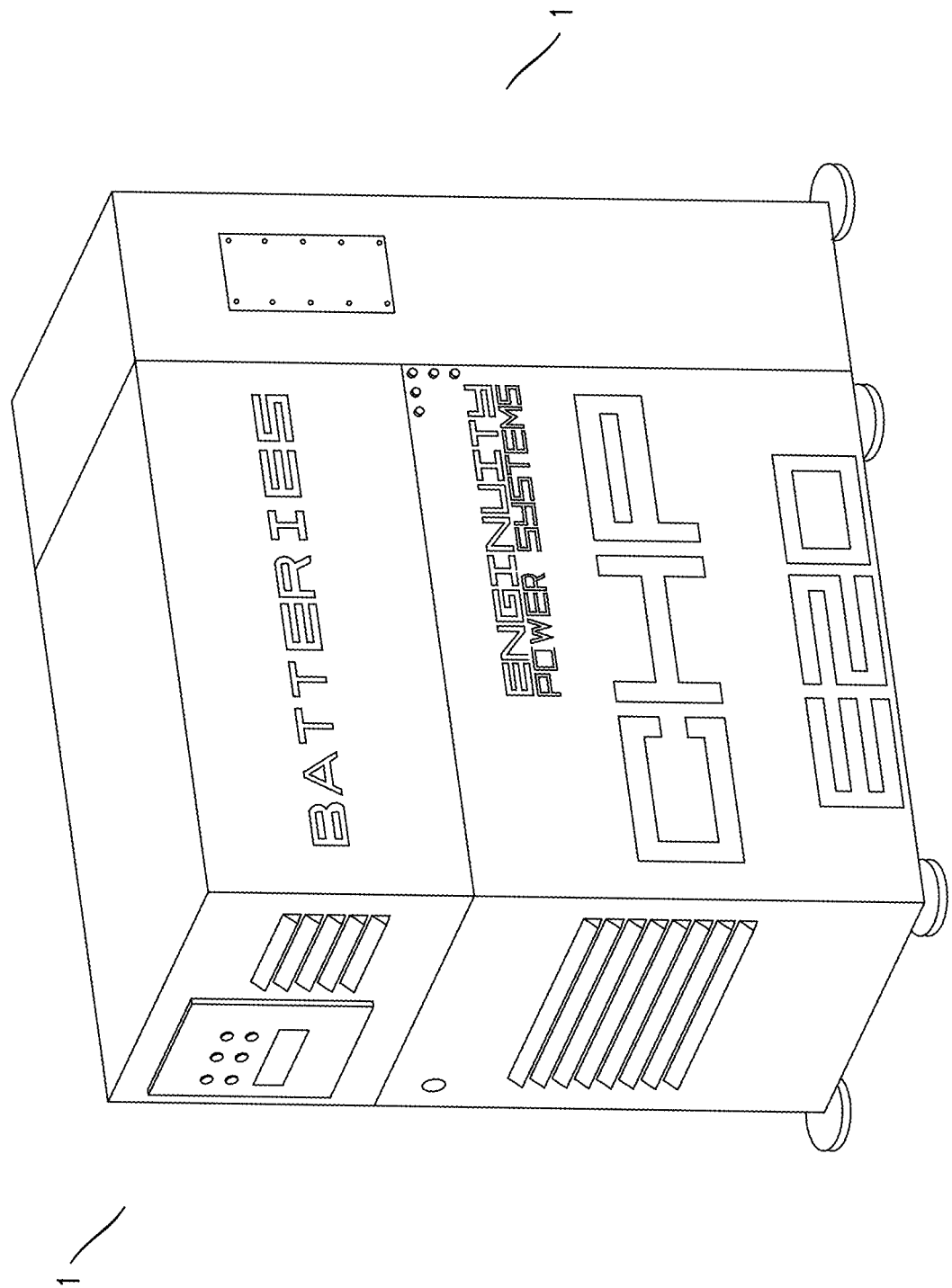
FIGS. 1 to 3 depict exterior views of an exemplary integrated and compact CHP system on a single chassis in accordance with an embodiment of the present disclosure.

To the extent that any of the figures or text included or referred to herein depicts or describes dimensions (weights, lengths, widths, heights), operating parameters such as power levels and efficiencies or other operating parameters it should be understood that such information is merely exemplary and non-limiting and, therefore, included to aid the reader in understanding the embodiments described herein. It should be understood, therefore, that such information is provided to enable one skilled in the art to make and use an exemplary embodiment of the disclosure without departing from the scope of the disclosure.

It should be understood that, although specific exemplary embodiments are discussed herein, there is no intent to limit the scope of the present disclosure to such embodiments. To the contrary, it should be understood that the exemplary embodiments discussed herein are for illustrative purposes, and that modified and alternative embodiments may be implemented without departing from the scope of the present disclosure. Exemplary embodiments of CHP systems and related methods are described herein and are shown by way of example in the drawings. Throughout the following description and drawings, like reference numbers/characters refer to like elements.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed and may also include additional steps not included in a description of the process/method if such additional steps are well known in the art.

As used herein, the term "and/or" includes any and all combinations of one or more of the associated listed items. As used herein, the singular forms "a," "an" and "the" are intended to include the plural form, unless the context and/or common sense indicates otherwise.

As used herein the phrase "configured to" means—functions to—or—connected to—unless the context, common sense or the knowledge of one skilled in the art dictates otherwise.

As used herein, the term "embodiment" and/or "exemplary" refers to an example of the present disclosure.

When used herein the term "lightweight" means a CHP system on a single chassis that is less than 1,000 pounds with four batteries included in the CHP. Compared to existing systems, such a system is relatively lightweight (i.e., weights far less than existing systems that include comparable components).

When used herein the term "compact" means a lightweight CHP system on a single chassis having a volume that does not exceed a maximum volume. By "maximum volume" is meant a lightweight CHP system on a single chassis having a volume that does not exceed an approximate volume equal to an approximate length of no more than six feet, an approximate width of no more than three feet and an approximate height of no more than six feet (e.g., four to five in feet, two feet wide and four to five feet in height).

When used herein the term "integrated" means all of the elements of a lightweight, compact CHP system 1 are supported by a single chassis as compared to existing systems that are on multiple chassis.

When used herein the phrase "carb-approved" means at least an engine that meets or exceeds the emission standards set by the California Air Resources Board.

Figure 2:
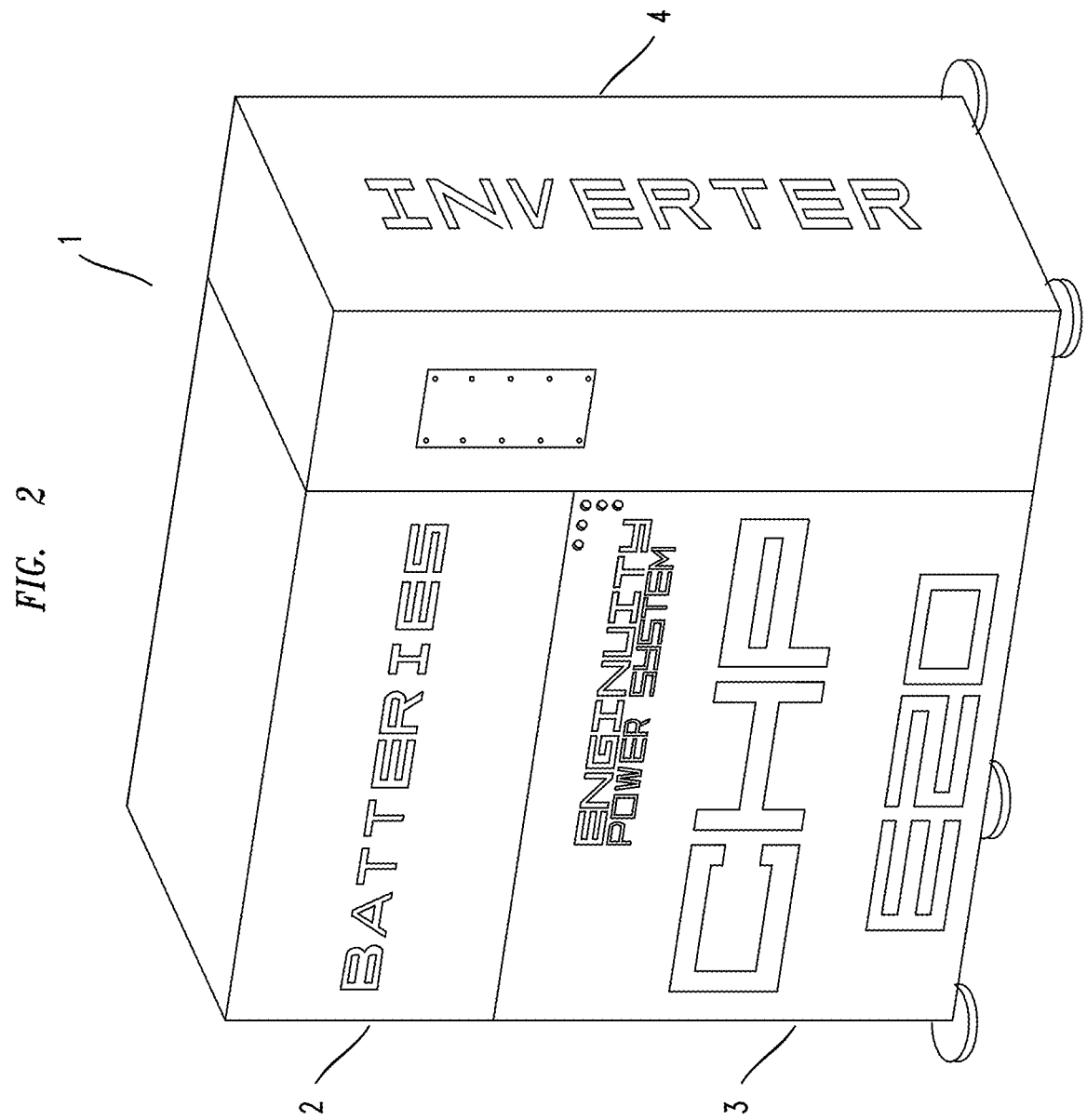
Figure 3:
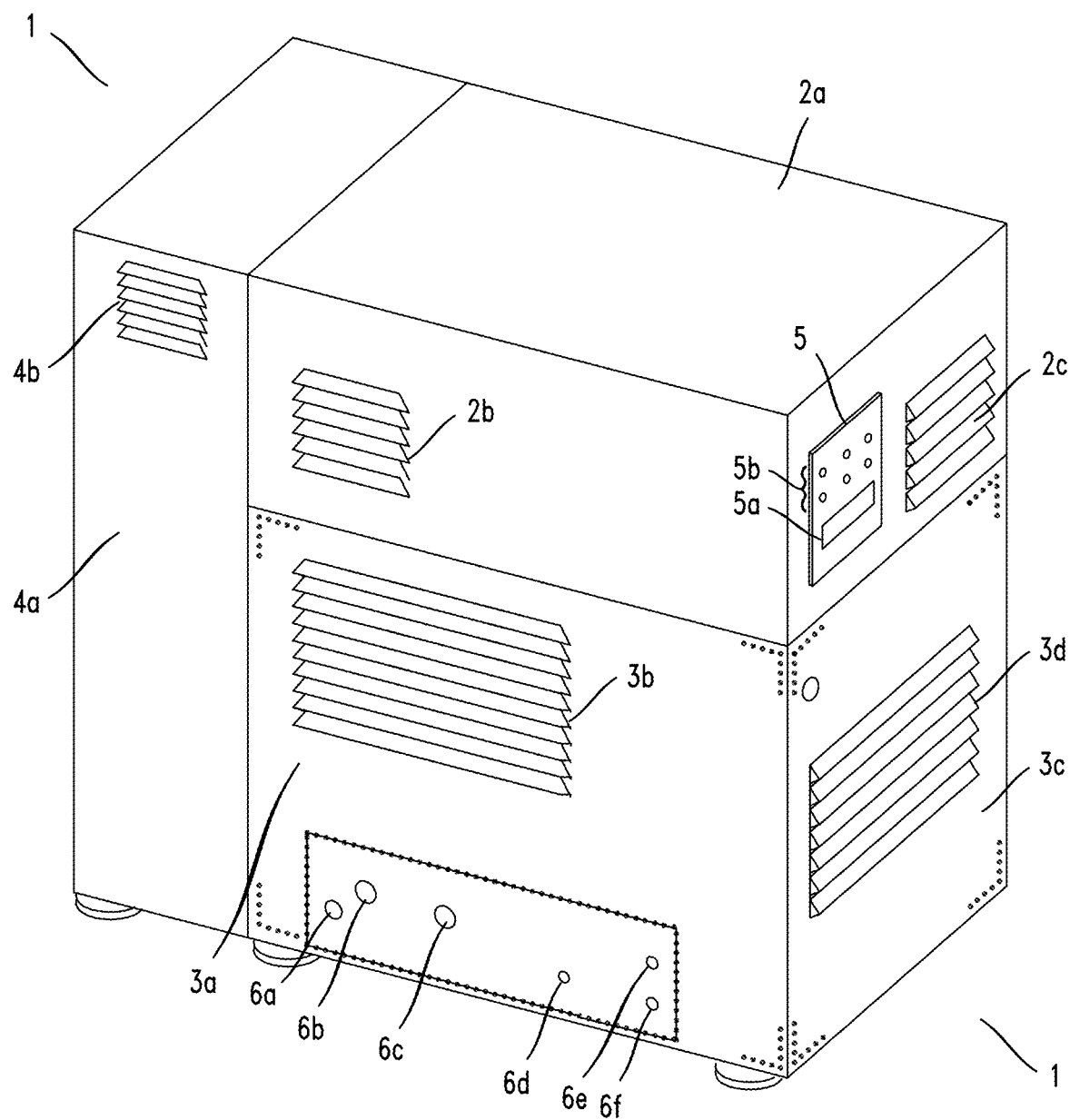
Figure 7:
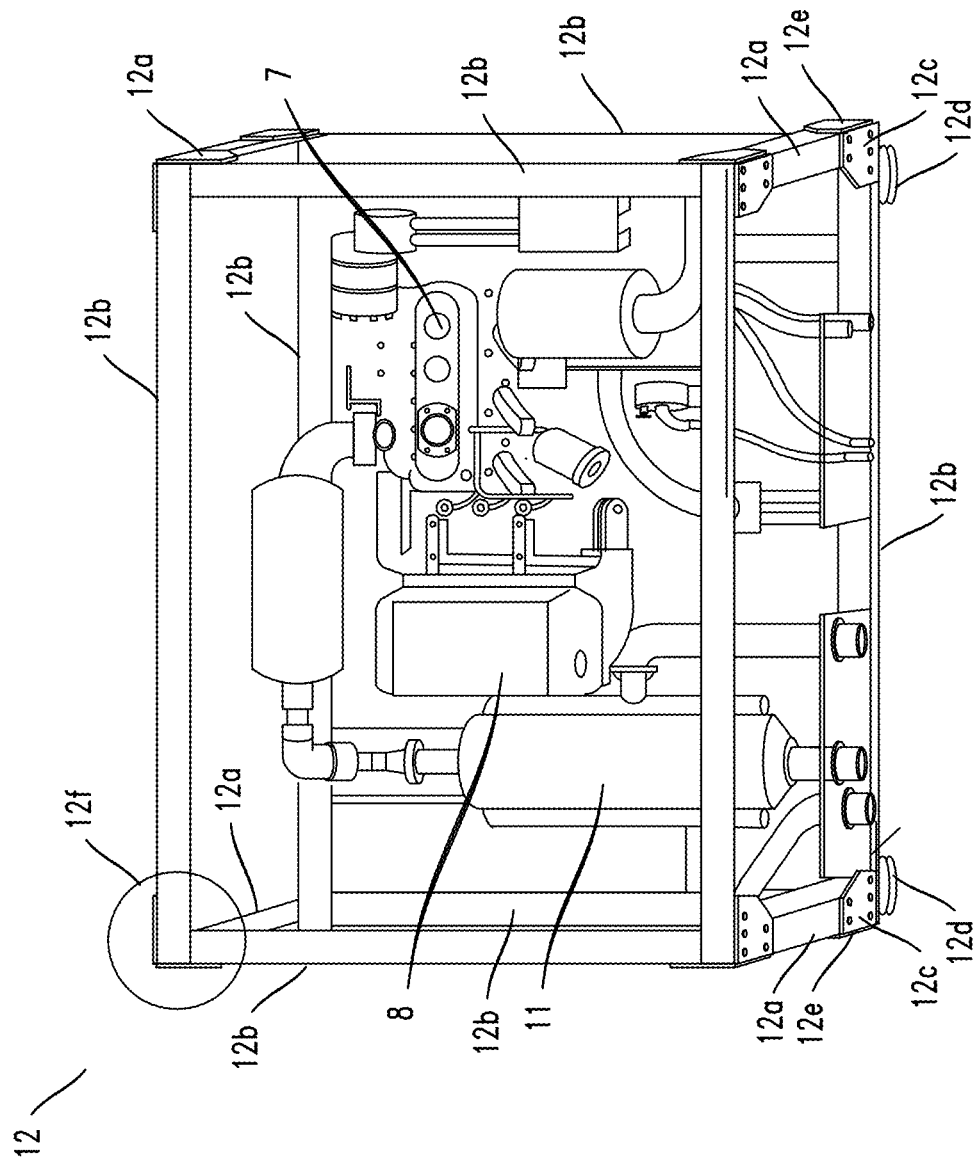
FIGS. 7 and 8 depict interior views of an exemplary integrated and compact CHP system on a single chassis with its' covers removed in accordance with an embodiment of the present disclosure.
Figure 8:
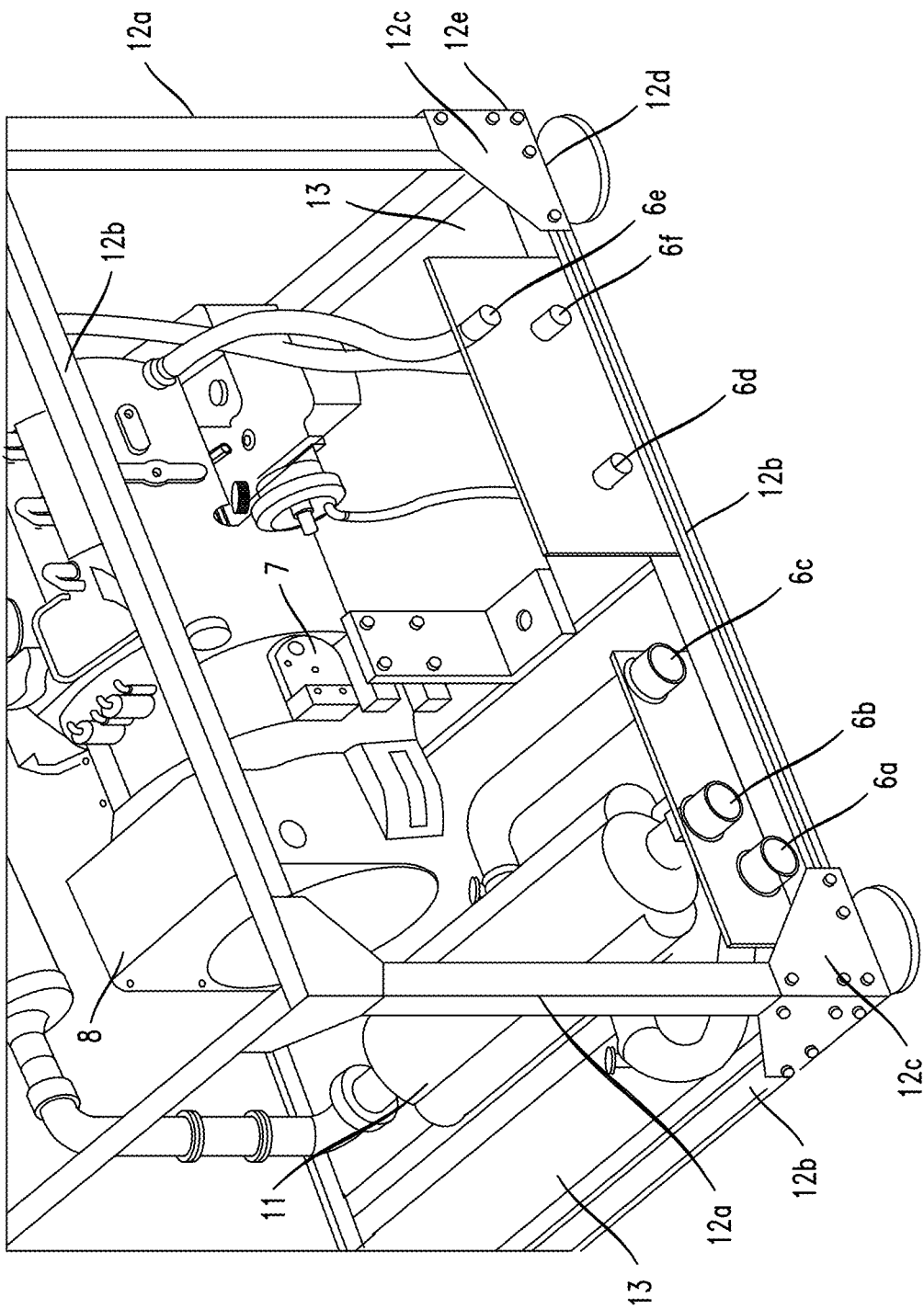

Referring to FIGS. 1 to 3 there are depicted exterior views of an exemplary integrated, lightweight and compact CHP system 1 on, and connected to, a single chassis according to an embodiment of the disclosure (the chassis 12 is shown in FIGS. 7 and 8).

As depicted, the CHP system 1 may be configured to include a battery compartment 2 comprising one or more electrical batteries, engine compartment 3 and an inverter compartment 4 comprising one or more electrical inverters, though it should be understood that the positions of each of the compartments on the single chassis may change depending on size or technical requirements, provided however, that all of the compartments remain on the single chassis. Size-wise, the overall dimension of the system may be four to five in feet in length (L), two feet wide (W) and four to five feet in height (H). Individually, as a non-limiting example, the CHP compartment may measure four in feet in length, two feet wide and three feet in height, for example. Weight-wise, the overall system may be considered "lightweight" compared to existing, non-integrated systems that include an engine, generator, batteries and a local control section because the system 1 may weigh less than 1,000 pounds with four batteries 9 installed in the battery compartment, for example (see batteries 9 in FIG. 4).

Power-wise, the system 1 may be configured to provide eight kilowatts to twenty-five kilowatts of power with, again, four batteries 9 installed. That said, the more batteries that are included in the system 1 the higher the power output such that the eight to twenty five kilowatts of power is merely a non-limiting range of power.

Because all of the elements of the system 1 are on a single chassis as compared to existing systems that are on multiple chassis the system can be said to be integrated on a single chassis. Further, because all of the elements of the system 1 are configured and connected to fit on a single chassis having a volume that does not exceed a maximum volume as described further herein, the system can be said to be compact as compared to existing systems that require more than one chassis, or a very large chassis compared to the inventive chassis (see element 12 in FIG. 7).

Still further, the installation of the integrated, lightweight and compact system 1 is greatly simplified versus existing systems that require multiple elements to be individually installed and then connected together in order to operate as a system.

Referring more particularly to FIG. 3 there is depicted a more detailed exterior view of the system 1. In an embodiment, the integrated, lightweight and compact system 1 may comprise: an external inverter cover 4a that includes one or more inverter ventilation openings 4b to allow air to circulate into the system 1 and cool the one or more electrical inverters (see component labeled 10 in FIG. 5) within the inverter compartment; an external battery cover 2a and one or more battery ventilation openings 2b,2c to allow air to circulate into the system 1 and cool the one or more batteries (see components labeled 9 in FIGS. 4 to 6); external CHP covers 3a,3c, each of which may include one or more engine ventilation openings 3b, 3d to allow air to circulate into the system 1 and cool the one or more components of the engine compartment (see components labeled 7, 8 and 11 in FIGS.

4 to 8). Though only exterior covers 2a, 3a, 3c and 4a are shown in FIG. 3 it should be understood that each side and the top of the system 1 may include an exterior cover, for example.

Also depicted in FIG. 3 is an exemplary control section 5 that may include an electronic display 5a configured to display information about the operation of the system 1 (e.g., alerts, temperatures, battery life, voltages, etc.,) that is connected to the cover 2a by one or more fasteners 5b. Also shown are inputs/outputs 6a to 6f (see also FIG. 8) discussed below.

Figure 4:
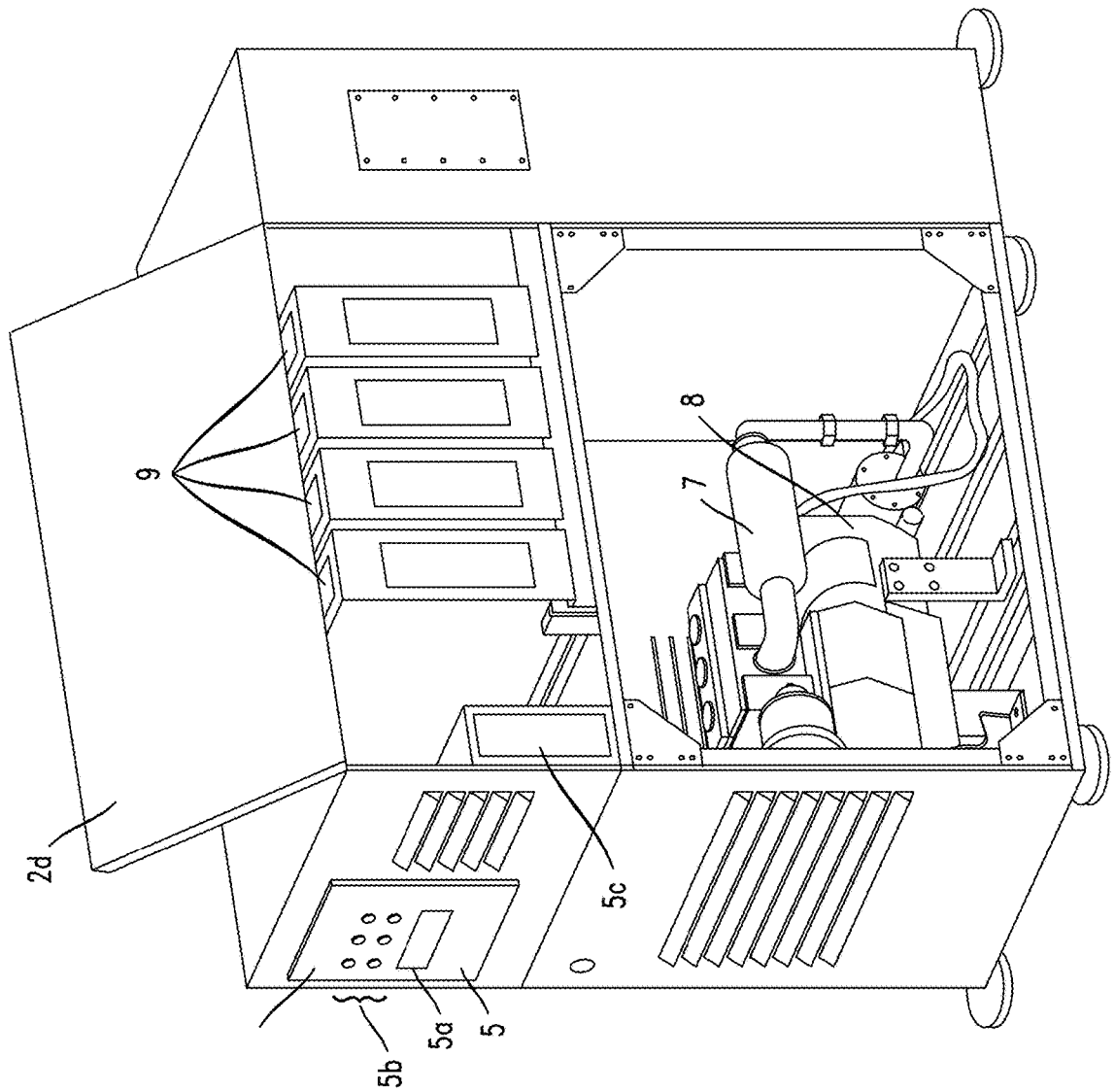
FIGS. 4 to 6 depict exterior views of an exemplary integrated and compact CHP system on a single chassis with one or more of the exterior covers opened and/or removed in accordance with embodiments of the present disclosure.

Referring now to FIG. 4 there is depicted another exterior view of the integrated, lightweight and compact system 1 on a single chassis with one or more of the exterior covers open and/or removed (e.g., battery cover 2d is open) in accordance with an embodiment of the present disclosure. As depicted, within the interior of the exemplary CHP system 1 there may be positioned one or more carb-approved engines or fuel cells 7 within the engine compartment 3 (e.g., two or four cycle combustion or compression engines, electrical engines) for generating power, one or more electrical generators 8 for generating electricity at one or more alternating current (AC) power levels (120 volts. 240 volts) and one or more removable and rechargeable batteries 9 (i.e., battery pack composed of, for example, lead-acid, nickel-cadmium, lithium-ion nickel metal hydride or solid state materials) for storing energy as direct current (DC) power and providing energy to the system 1 (e.g., to start the engine 7) and/or to an external building or residential home, for example. In an embodiment, each battery 9 may provide 3 to 4 kilowatts of power (e.g., 3.3 kilowatts per battery 9) and may weigh approximately 30 pounds though these are merely non-limiting, exemplary power and weight parameters. Further, though FIG. 4 depicts four removable and rechargeable batteries 9 this is also a non-limiting example. Fewer batteries (e.g. one to three) or more batteries (e.g., up to twenty) may be added to the system 1.

Though only a single engine 7 and generator 8 are shown in FIG. 4, this is also merely exemplary. In alternative embodiments the integrated, lightweight and compact system 1 may include a plurality of generators and/or engines (e.g., two engines, two to four or more generators).

Figure 5:
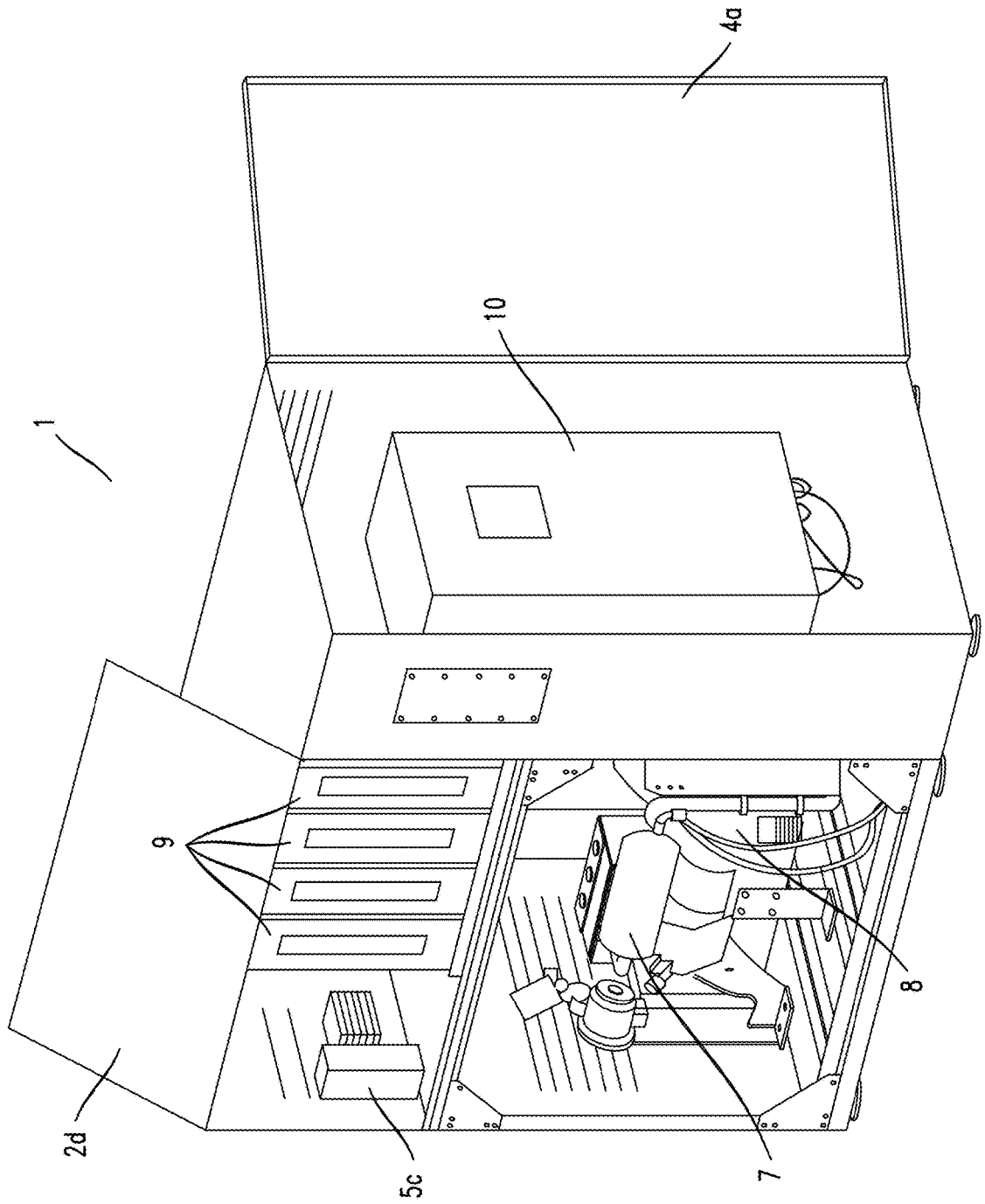

Referring now to FIG. 5 there is depicted yet another exterior view of the CHP system 1 on a single chassis with one or more of the exterior covers open and/or removed (e.g., battery cover 2d and inverter cover 4a are open or removed) in accordance with an embodiment of the present disclosure.

Similar to FIG. 4, within the interior of the exemplary integrated, lightweight and compact system 1 there may be positioned the same components on the same single chassis, namely: one or more engines 7 for generating power, the same one or more electrical generators 8 for generating electricity at AC power levels (referred to in the singular hereafter as "generator" though there may be a plurality of generators), and the same one or more batteries 9 for storing energy as DC power and providing energy to the system 1 (may be referred to in the singular hereafter as "battery" though there may be a plurality of batteries) and/or to an external building or residential home, for example. In addition, FIG. 5 depicts one or more inverters 10 (referred to in the singular hereafter as "inverter" though there may be a plurality of inverters) for transforming and inverting the AC power level generated by the one or more generators 8 into one or more DC power levels and then back (inversion) to one or more, reduced-noise AC power levels.

Also shown in FIG. 5 is a battery temperature control unit 5c which may comprise a temperature sensor and fan (not shown), for example. In an embodiment, the unit 5c may be configured to monitor the temperature of the batteries 9 and when the temperature exceeds a preset threshold the unit 5c may cool the batteries by sending a signal to an integral fan motor that is configured to move the fan which forces air over the batteries 9 in order to reduce the temperature of the batteries 9.

Figure 6:
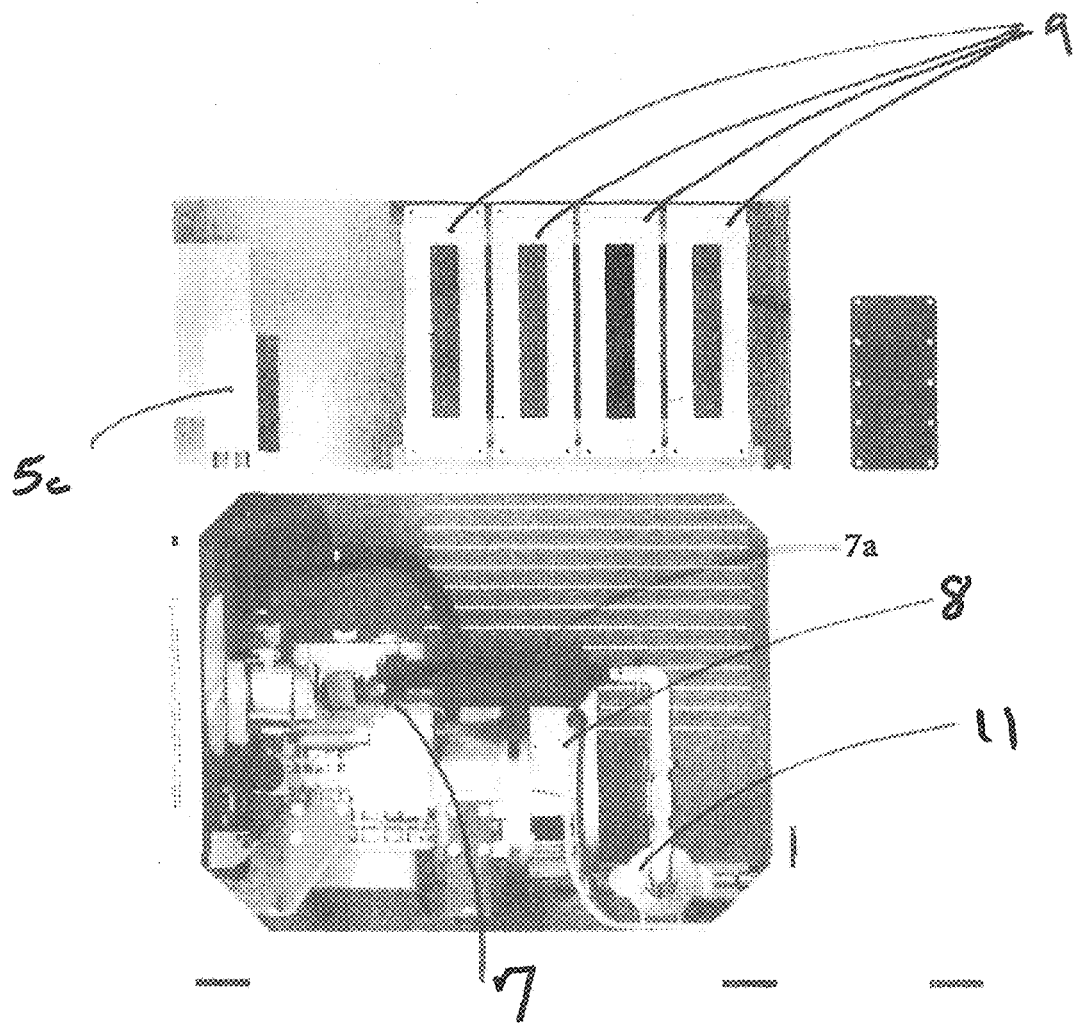

Referring now to FIG. 6 there is depicted still another exterior view of the system 1 on a single chassis with one or more of the exterior covers open and/or removed (e.g., battery cover 2d and inverter cover 4a are again open or removed) in accordance with an embodiment of the present disclosure. As shown, this view again depicts an exemplary position for the one or more batteries 9, engine 7 and generator 8. In addition, this view includes a view of the catalytic converter 7a, one or more internal heat exchanger units 11 (referred to in the singular hereafter as "unit" though there may be a plurality of units). In an embodiment, heated gas from the engine 7 may be exhausted through the heat exchanger unit 11. The passage of the heated gas through the unit 11 increases the temperature of the unit 11. Further, heat from the heated gas (i.e., unit 11) may be transferred to a coolant, such as a glycol or water, that comes into contact with the unit 11 via interior piping within the system 1 (see FIG. 8). The heated water may be transported via the interior piping to external piping and then to a building or residential home for usage.

Still further, the internal heat exchanger unit 11 may be configured to muffle or reduce the sound level of the exhaust gas that is being output from the system 1.

Referring now to FIG. 7 there is depicted an interior view of the exemplary integrated and compact CHP system 1 on a single chassis 12 with its' covers and batteries 9 removed in accordance with an embodiment of the present disclosure. With its covers removed the reader can clearly see the exemplary positions and configuration of the engine 7, engine components, generator 8 and heat exchanger unit 11. As shown, the chassis 12 may be constructed of: (i) a plurality of vertical supporting columns 12a, each vertical column 12a being mechanically connected at each of its ends (i.e., top end and bottom end) by (ii) at least two horizontal arms 12b and (iii) bottom cover 13. Further, at the connection of each column 12a and arm 12b the chassis 12 may also include a reinforcement plate 12c (e.g., triangular shaped plate). In an embodiment, the base 12d of a plate 12c may be connected to an arm 12b while the altitude 12e of the plate 12c may be connected to a column 12a. In an embodiment each corner 12f of the chassis 12 may comprise two plates 12c.

In embodiments, each column 12a and arm 12b may be composed of a folded steel, aluminum or carbon fiber material to name just a few of the lightweight materials making up the components of the chassis 12.

FIG. 8 also depicts an interior view of the exemplary integrated and compact CHP system 1 on a single chassis 12 with its' covers and batteries 9 removed. In this view, inputs and outputs 6a to 6f are also clearly shown. In an embodiment, the inputs/outputs may comprise the following: exhaust outlet 6b for transporting and outputting exhaust gas produced by operation of the engine 7 to the atmosphere; water outlet 6a for transporting hot water that has been heated by the heat exchanger 11 to piping (not shown) that leads to a building, residential house or simply to a storage system (e.g., hot water tank); water inlet 6c for transporting cold, cooler (as compared to the heated water) or room temperature water from an external source (e.g., piping from a building, residential home or from a tank) to the heat exchanger 11 to be warmed by the heat exchanger 11; fuel inlet 6d for transporting fuel such as gasoline or diesel to name just two of the many types of liquid fuel to the engine 7; coolant outlet 6e for transporting heated coolant from the engine 7; and coolant inlet or return 6f for transporting coolant to the engine 7 to cool the engine 7.

In slightly more detail, the heat exchanger 11 may be configured with a liquid jacket 11a positioned at two sides of the circumference of the exhaust section 11b of the exchanger 11. In an embodiment, heated exhausted gas within section 11b raises the temperature of the liquid (e.g., glycol, water) within the jacket 11a. Thereafter, the heated liquid may be transported to an external destination via outlet 6a, for example.

Backtracking somewhat, in an embodiment the control section 5 may comprise suitable electronics for completing Bluetooth enabled controls for operating components of the system 1, such as the inverter 10, generator 8, batteries 9 and engine 7.

Optionally, the chassis 12 may be provided with wheels for moving the system 1 if repairs need to be completed, for example.

In an embodiment, during operation of the integrated and compact CHP system 1 energy may initially be supplied to a home or business by the one or more batteries 9 that has been previously charged by the combination of the engine 7 and the inverter 10. When the control section 5 detects that the power level of the batteries 9 are (is) below a threshold, the control section 5 may send an electronic signal to a switch (not shown) that connects the inverter 10 to the batteries 9 in order to charge the batteries 9 to a higher power level.

Said another way, the control section 5 may be configured to detect a power level of the one or more batteries 9, and when the detected power level is below a threshold, the control section 5 is further configured to electrically connect the one or more inverters 10 to the one or more batteries 9 to charge the one or more batteries 9 to a higher power level, for example.

However, once the control section 5 and associated sensors (not shown) detect that the energy level of the batteries 9 has reached a certain pre-determined or set threshold level (e.g., 30% or less of battery life remains) electronics within the control section 5 may generate and send signals to the engine 7 to initiate the start-up of the engine 7 in order to recharge the batteries 9.

Said another way, the control section 5 may be further configured to detect that the power level of the one or more batteries 9 has reached a pre-determined or set threshold level. Thereafter the control section 5 may be further configured to initiate the start-up of the engine 7 in order to recharge the one or more batteries 9.

The control section 5 may comprise temperature controls that are operable to control the "on" and "off" supply of heated liquid from the heat exchanger 11. In more detail, in one embodiment electronics within the control section 5 (sometimes referred to as "control electronics") may be connected via wired or wireless means to switches or sensors (not shown) operable to detect signals from an external source, such as a water tank, that is requesting heated water. If such a signal indicates water is needed (e.g., an ON signal), then the control electronics may generate and send signals to heat exchanger 11 to allow water to be input via inlet 6c, heated by the heat exchanger 11 and then output via outlet 6a.

Conversely, once water is no longer needed, such switches or sensors may send an OFF signal to the control section 5 that, in turn, send signals to the heat exchanger 11 to prevent water from being output.

In an embodiment, the removable and rechargeable batteries 9 may provide a range of power. As noted previously, one non-limiting range may be 3 to 4 kilowatts of power, for example. Further, the batteries 9 may be removable batteries thus allowing one or more of the batteries 9 to be removed from the chassis 12 should the original batteries 9 fail or need to be otherwise replaced in order to allow a new or substitute battery to be installed into the system 1.

In an embodiments, when used to supply power (i.e., electricity) one or more of the batteries 9 may be configured to supply power to a home or building while another of the batteries 9 may be separately configured to start the engine 7, for example. Alternatively, the one or more of the same batteries 9 may be configured to supply power to a home and business and also start the engine 7.

In yet another embodiment the electronics in the control section 5 (see FIG. 3) may be configured to generate control signals based on electronic instructions stored in an electronic memory (not shown) to control the operation of the batteries 9 in order to allow energy stored in one or more of the batteries 9 to be sent or otherwise transmitted back to an existing power grid as desired or required. Still further, in an embodiment, a utility may install controls (not shown in figures) that permit the utility to request and receive energy stored within integrated CHP system 1 as needed. For example, it is known that many utilities must pay (other utilities, or energy source providers) a substantial premium to supply electrical energy to residential and commercial customers during "peak" energy time periods (e.g. when everyone turns their air conditioners on over the same time period during the summer months). This premium may amount to 25% or more of a utilities' yearly cost of providing electricity. In contrast, the embodiments of the present disclosure—when combined with required controls—allows such a utility to request and receive additional power from the system 1 instead of another utility at a lower cost.

Embodiments of the disclosure may lower a utility's cost of producing electricity in yet another way. For example, it is known that a substantial amount of energy from an energy source (coal) is lost between the time the energy source is used by a utility to generate electricity at an operating plant and the time the energy is actually delivered to a remote customer. By some estimates, 65% of the energy generated is lost by the time it is delivered to a customer's traditional heating and electrical system. In comparison, systems provided by the disclosure, such as system 1, installed at a location where the heat and electricity will be utilized have the capability of delivering approximately 60% more energy than traditional heating and electrical systems.

Figure 9:
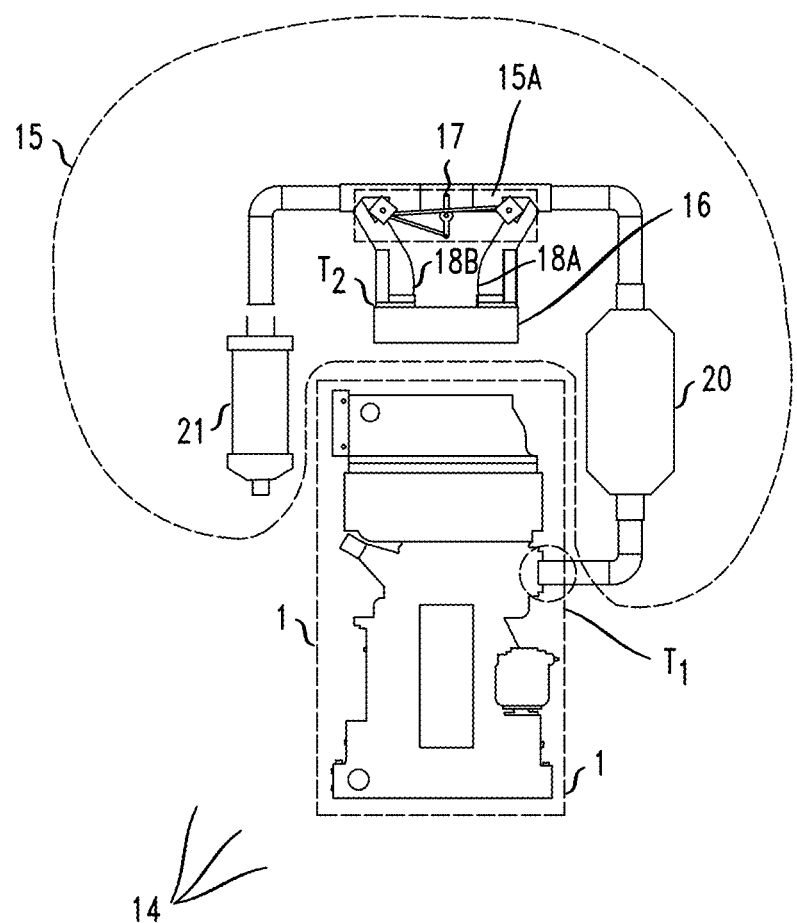
FIG. 9 depicts an inventive integrated and compact CHP system combined with an exhaust gas diverter system.

Referring now to FIG. 9 there is depicted an exemplary installation of an inventive system 14 that combines CHP system 1 with an exhaust gas diversion sub-system 15 (components within the dotted line of FIG. 9, excluding CHP system 1) that may be installed external to a residence or building, for example.

In an embodiment, the exhaust gas diversion sub-system (EGDS) 15 may be configured to control the flow of heated exhaust gases from CHP system 1. For example, the EGDS 15 may comprise an electro-mechanical diverter mechanism 15A configured to receive electrical or mechanical signals which control the flow of heated exhaust gases from the CHP system 1 in order to (1) completely expel the heated, exhaust gases to the atmosphere, and/or (2) direct the heated, exhaust gases to a second heat exchanger 16 in order to further transfer heat or energy from the heated, exhaust gases to a liquid within the exchanger 16 and to further reduce the temperature of the heated exhaust gases. For example, the temperature of the exhaust gas leaving the CHP system 1 at point $T_1$ in FIG. 9 may be 1300 degrees Fahrenheit while the temperature of the exhaust gas leaving the second heat exchanger 16 at point $T_2$ may be 150 degrees Fahrenheit to give some exemplary temperatures.

Figure 10A:
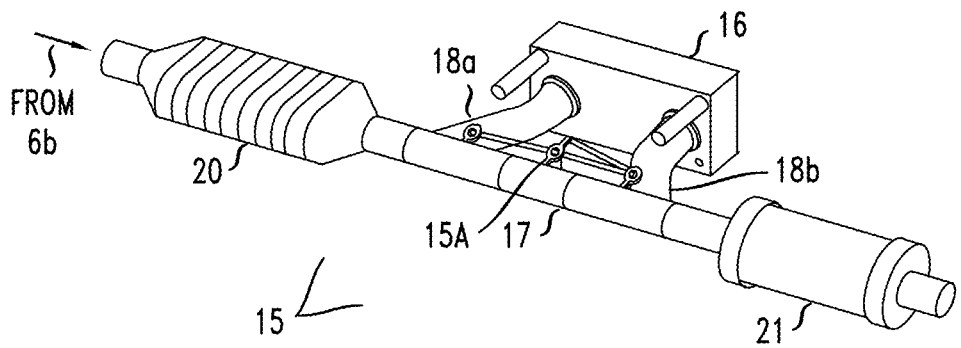
FIG. 10A depicts an exhaust gas diversion system that may be used in conjunction with an exemplary integrated and compact CHP system in accordance with an embodiment of the present disclosure.

Referring now to FIG. 10A there is depicted an enlarged view of the EGDS sub-system 15 and second heat exchanger 16. The exemplary configuration shown in FIG. 10A also includes a second catalytic converter 20 positioned inline of the exhaust gases and before (on input piping 18*a*) and , , , the second heat exchanger 16 and a muffler 21 positioned inline of the exhaust gases and after (on output piping 18*b*) the second heat exchanger 16. Further, the configuration in FIG. 10A includes a connecting through-pipe 17 positioned inline of the exhaust gases that connects the input side to the output side of the second heat exchanger 16.

In an embodiment the second heat exchanger 16 may comprise an air-to-liquid heat exchanger where heated exhaust gases from the outlet 6*b* of CHP system 1 are input via piping 18*a* and subsequently transfer heat to a liquid (e.g., water) within internal coils, piping or radiators (not shown) of the exchanger 16 thereby increasing the temperature of the liquid within the exchanger 16 and decreasing the temperature of the exhaust gases. The warmed or heated liquid within the second heat exchanger 16 may be transported via piping to a residence or building (not shown) for usage (e.g., heated flooring, radiator heating) or storage (e.g., in a hot water tank).

Figure 11A:
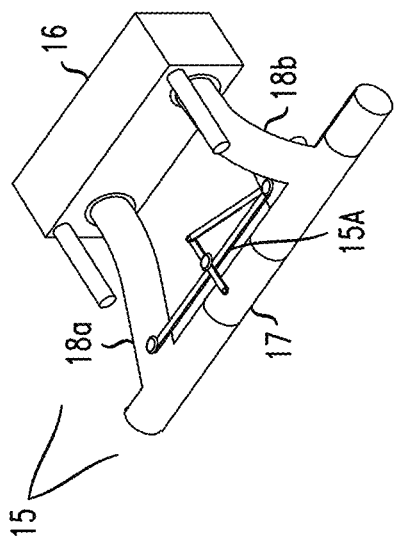
FIGS. 11A to 11C depict alternative configurations of an exhaust gas diversion system in accordance with an embodiment of the present disclosure.
Figure 11B:
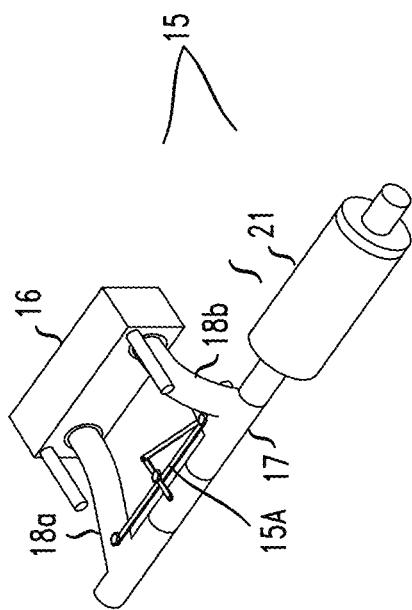
Figure 11C:
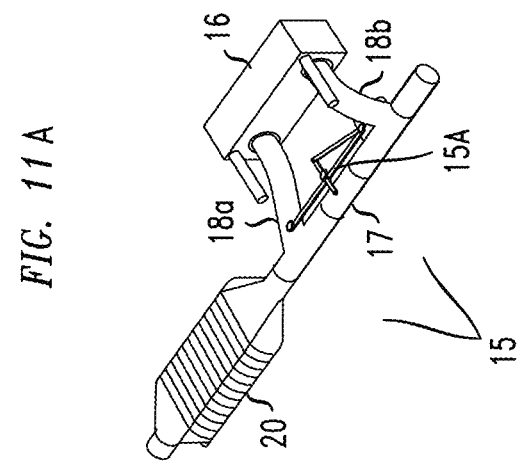

It should be noted that the configuration shown in FIG. 10A is one of many different configurations. FIGS. 11A to 11C depict additional configurations of an exhaust gas diversion sub-system which include (i) a second catalytic converter 20, but no muffler (FIG. 11A), (ii) a muffler 21, but no second catalytic converter (FIG. 11B) and (iii) no second catalytic converter and muffler (FIG. 11C).

FIGS. 10B to 10E depict exemplary flows of exhaust gases in an exhaust gas diversion sub-system 15 depending on whether or not the mechanism 15A allows the exhaust gases to flow to the second heat exchanger 16.

Figure 10B:
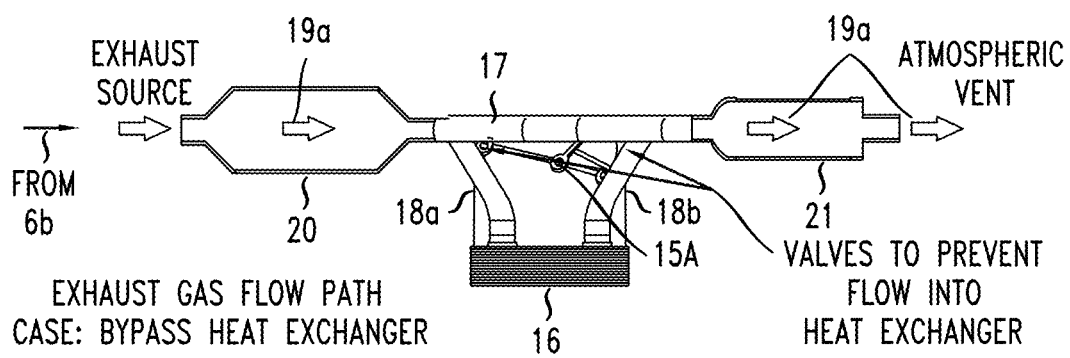
FIGS. 10B to 10E depict exemplary flows of exhaust gases in an exhaust gas diversion system in accordance with embodiments of the present disclosure.
Figure 10C:
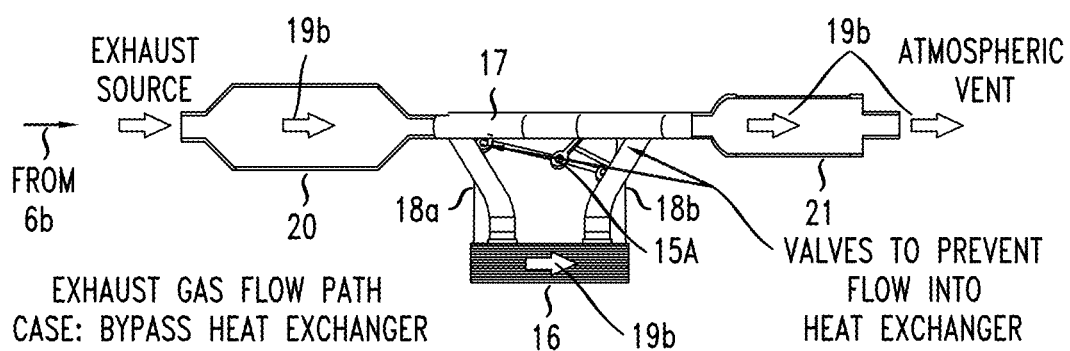
Figure 10D:
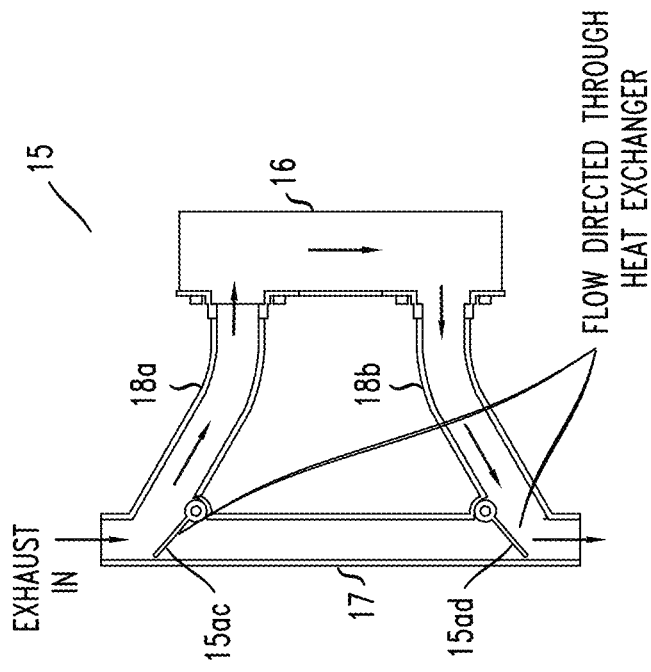
Figure 10E:
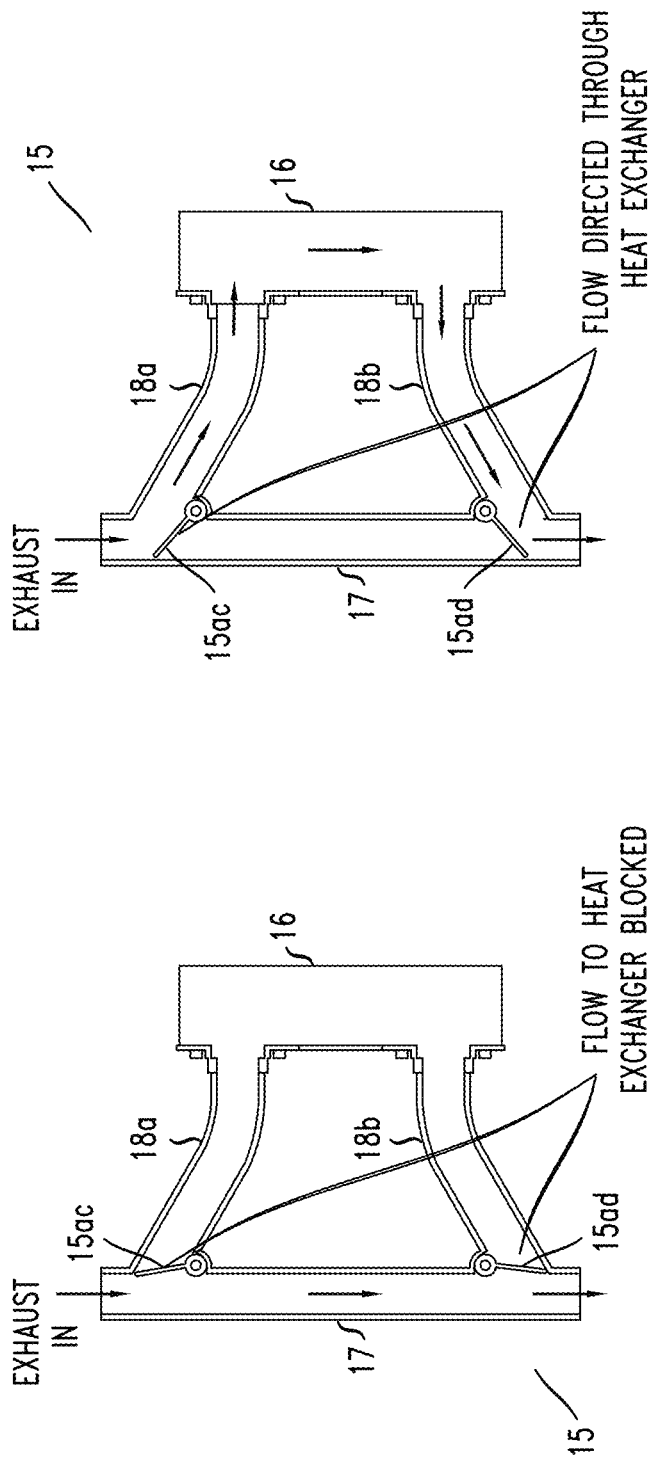

For example, in the configuration of depicted in FIGS. 10B and 10D the mechanism 15A has prevented the exhaust gases from flowing to the second heat exchanger 16 while in FIGS. 10C and 10E the mechanism 15A has allowed the exhaust gases to flow to the second heat exchanger 16.

In slightly more detail, in the embodiment depicted in FIG. 10B the mechanism 15A has received electrical, electronic or electro-mechanical control signals from a control unit (not shown; but see component 5) that direct diverters within piping 18*a* and 18*b* to prevent exhaust gases 19*a* from flowing into (or out of) the second heat exchanger 16. Similarly, in the embodiment depicted in FIG. 10C the mechanism 15A has received electrical, electronic or electro-mechanical control signals from a control unit (not shown) that direct diverters within piping 18*a* and 18*b* to allow exhaust gases 19*b* to flow into (and out of) the second heat exchanger 16.

Figure 12A:
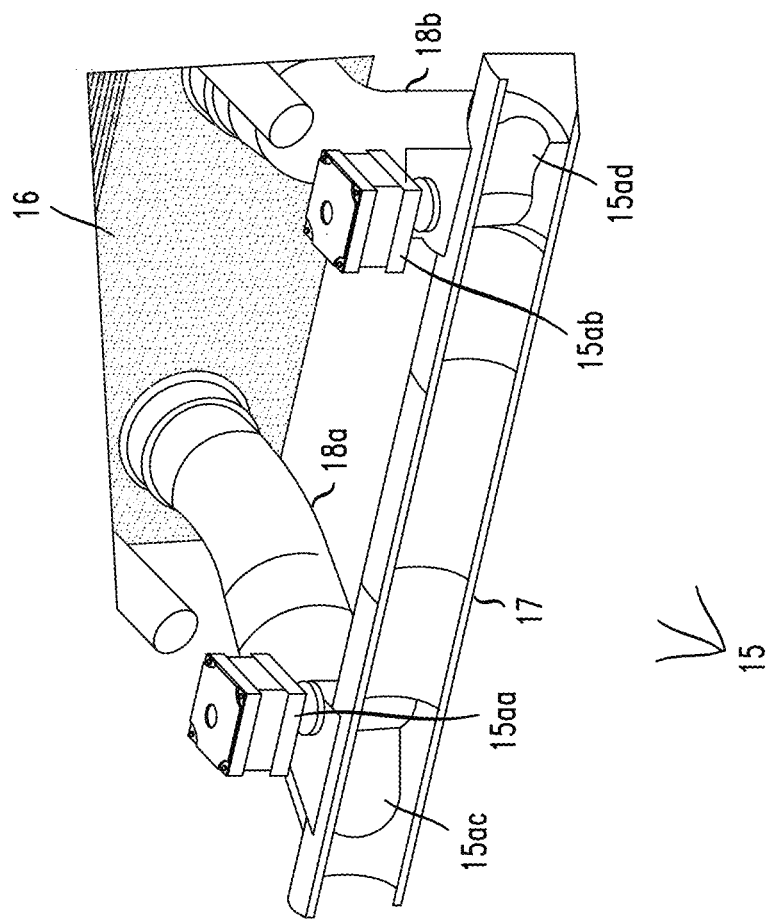

Referring now to FIGS. 12A and 12B there are depicted embodiments of the mechanism 15A.

In FIG. 12A the mechanism 15A may comprise one or more electronic actuators 15*aa*, 15*ab*. As shown in FIG. 12A, in one embodiment a separate actuator 15*aa* may be configured at the input of the second heat exchanger 16, for example at the connection of the input piping 18*a* to an end of the through piping 17 and another (second) separate actuator 15*ab* may be positioned at the output of the second heat exchanger 16, for example at the connection of the output piping 18*b* to an opposite end of the through piping 17. To allow exhaust gases to flow into and out of the second heat exchanger 16 the actuators 15*aa*, 15*ab* may receive electrical, electronic or electro-mechanical control signals from a control unit (not shown).

In more detail, upon receiving such a control signal at actuator 15*aa* an internal motor within actuator 15*aa* may energized in order to move diverter 15*ac* to a position that allows exhaust gases to flow into the exchanger 16 via piping 18*a* by blocking the exhaust gases from flowing into through piping 17. Similarly, upon receiving such a control signal at actuator 15*ab* an internal motor within actuator 15*ab* may energized in order to move diverter 15*ad* to a position that allows exhaust gases to flow from the exchanger 16 via piping 18*b* by blocking the exhaust gases from flowing backwards towards actuator 15*ab* via through piping 17.

In FIG. 12B the mechanism 15A may comprise a mechanical linkage structure 15*b* comprising one or more linkage arms 15*c* and movable hinges 15*ba*, 15*bb* and 15*bc*. As shown in FIG. 12B, in one embodiment a first hinge 15*ba* may be configured at the input of the second heat exchanger 16, for example at the connection of the input piping 18*a* to an end of the through piping 17 and another (second) separate hinge 15*bb* may be positioned at the output of the second heat exchanger 16, for example at the connection of the output piping 18*b* to an opposite end of the through piping 17. A third hinge 15*bc* ("master hinge') may be connected to the center of the mechanism 15*b*.

To allow exhaust gases to flow into and out of the second heat exchanger 16 the master hinge 15*bc* may receive electrical, electronic or electro-mechanical control signals from a control unit (not shown; but see component 5) or may be moved manually by a person. For example, in one embodiment upon receiving such a control signal hinge 15*bc* may move thereby causing the arms 15*c* to move which, in turn, causes connected hinges 15*ba* and 15*bb* to turn.

Once hinge 15*ba* turns it causes connected diverter 15*ac* to turn to a position that allows exhaust gases to flow into the exchanger 16 via piping 18*a* by blocking the exhaust gases from flowing into through piping 17. Similarly, once hinge 15*bb* turns it causes connected diverter 15*ad* to turn to a position that allows exhaust gases to flow from the exchanger 16 via piping 18*b* by blocking the exhaust gases from flowing backwards towards hinge 15*ba* via through piping 17.

The configurations shown in the figures and described above are just some of the embodiments made possible by the present disclosure—others are possible For example, in yet an additional embodiment, the second heat exchanger 16 may be connected to a pump (not shown) that forces liquid that has been heated by the exhaust gases into a set of pipes buried underground where the temperature of the ground is cooler than the atmosphere (e.g., 55 degrees Fahrenheit). Accordingly, the heated liquid may be transported through the buried pipes where it is cooled. The now cooled liquid may then be transported via additional piping to an air handler (not shown in figures) where fans may force air over the additional piping containing the cooled liquid. Upon traveling over (or through) the cooled piping the air from the fans is cooled and, thereafter, may be transported through conduits into the building or residence to cool the air therein (i.e., to provide air conditioning).

It should be understood that the preceding is merely a detailed description of various embodiments of the disclosure and that numerous changes to the disclosed embodiments can be made in accordance with the disclosure herein without departing from the scope of the disclosure. The preceding description, therefore, is not meant to limit the scope of the disclosure. Rather, the scope of the disclosure is to be determined only by the appended claims and their equivalents.

We claim:

1. An integrated, lightweight and compact power generation system on a single chassis comprising:
   one or more compartments, the one or more compartments comprising,
   one or more batteries;
   an engine and one or more internal heat exchanger units for converting heat from heated gas from the engine to a heat exchange fluid;
   one or more electrical inverters;
   an electronic control section, and
   wherein the one or more batteries, the engine, the one or more electrical inverters and the electronic control section are integrated on the single chassis.

2. The system as in claim 1 wherein the volume of the system comprises a volume of four to five in feet in length, two feet wide and four to five feet in height.

3. The system as in claim 1 wherein the number of batteries is four.

4. The system as in claim 3 wherein the weight of the system comprises less than 1,000 pounds.

5. The system as in claim 1 wherein the system is configured to generate eight kilowatts to twenty-five kilowatts of power.

6. The system as in claim 1 wherein the engine comprises a carb-approved engine or fuel cell.

7. The system as in claim 6 wherein the carb-approved engine comprises a two cycle or four cycle combustion or compression engine.

8. The system as in claim 1 wherein the engine comprises an electrical engine.

9. The system as in claim 1 further comprising one or more electrical generators for generating electricity at one or more alternating current (AC) power levels.

10. The system as in claim 1 wherein the one or more batteries comprises one or more removable and rechargeable batteries for storing energy as direct current (DC) power.

11. The system as in claim 10 wherein each of the one or more batteries is configured to generate 3 to 4 kilowatts of power.

12. The system as in claim 1 wherein the one or more batteries comprise removable and rechargeable batteries.

13. The system as in claim 1 further comprising a catalytic converter.

14. The system as in claim 1 wherein the single chassis comprises a chassis constructed of a plurality of vertical supporting columns, where each vertical column is mechanically connected at each of its ends by at least two horizontal arms and a bottom cover.

15. The system as in claim 14 wherein each column and arm is composed of a folded steel, aluminum or carbon fiber material.

16. The system as in claim 1 wherein the electronic control section comprises electronics for completing Bluetooth enabled controls to operate the one or more inverters, one or more batteries and the engine.

17. The system as in claim 1 wherein the control section is configured to detect a power level of the one or more batteries, and when the detected power level is below a threshold, the control section is further configured to electrically connect the one or more inverters to the one or more batteries to charge the one or more batteries to a higher power level.

18. The system as in claim 1 wherein the control section is configured to detect a power level of the one or more batteries has reached a pre-determined or set threshold level, the control section is further configured to initiate the start-up of the engine in order to recharge the one or more batteries.

19. The system as in claim 1 further comprising an exhaust gas diversion sub-system configured to control a flow of heated exhaust gases from the system.

20. The system as in claim 19 wherein the exhaust gas diversion sub-system is configured to receive electrical or mechanical signals to control the flow of heated exhaust gases from the system to completely expel the heated exhaust gases to the atmosphere, or direct the heated exhaust gases to a second heat exchanger in order to further transfer heat or energy from the heated, exhaust gases to a liquid within the second exchanger and to further reduce a temperature of the heated exhaust gases.

* * * * *